United States Patent
Muller

[11] 3,726,493
[45] Apr. 10, 1973

[54] AIR CUSHION SYSTEM FOR AIRCRAFT REMOVAL

[76] Inventor: Albert F. Muller, 400 Scott Street, Baytown, Tex. 77520

[22] Filed: Dec. 2, 1970

[21] Appl. No.: 94,312

[52] U.S. Cl. ............... 244/2, 244/23, 244/100, 244/139, 180/124, 180/127
[51] Int. Cl. .............................. B64c 37/00
[58] Field of Search ............ 244/2, 23, 1, 139, 244/100; 180/124, 127

[56] References Cited

UNITED STATES PATENTS

| | | | |
|---|---|---|---|
| 3,072,930 | 1/1963 | Fraehel | 9/11 A |
| 3,155,992 | 11/1964 | Shewmake et al. | 9/11 A |
| 3,520,381 | 7/1970 | Pinder | 180/127 |
| 3,502,168 | 3/1970 | Jones | 180/127 |

FOREIGN PATENTS OR APPLICATIONS

| | | | |
|---|---|---|---|
| 272,359 | 1/1965 | Australia | 180/127 |
| 1,556,009 | 1/1970 | Germany | 180/127 |

OTHER PUBLICATIONS

Hovering Craft and Hydrofoil, Kalerghi Publications, Volume 6, Number 11, August 1967, Pages 14–16.

*Primary Examiner*—Milton Buchler
*Assistant Examiner*—Curt A. Rutledge
*Attorney*—Lowe and King

[57] ABSTRACT

Apparatus and method for quick conversion of a disabled aircraft or other structure to a ground effects machine includes the use of a flexible skirt conforming to the periphery of the structure and adhesive strip means for attachment of the skirt at the top edge thereof. At the bottom edge of the skirt, laterally extending cross ties hold the lower edge inwardly to provide a captive air space, said air space being defined by the lower portion of the aircraft and the skirt. Superatmospheric air supply is provided to the space from the fan jet portion of an engine of the aircraft through an annular collector, a transfer tube and a peripheral manifold on said skirt. The manifold is substantially tear shaped in cross section and assists in holding the strip means against the surface of the structure and isolated from peeling forces and transient pressure changes in the air space. Alternatively, V-shaped adhesive tape formed with upwardly and downwardly flaps holds the top of the skirt so as to resist peeling. Crawler tube means are provided to extend the stabilizing cross ties beneath the aircraft for attachment and high strength contact adhesive tape or epoxy resin is utilized to form the adhering strip.

19 Claims, 9 Drawing Figures

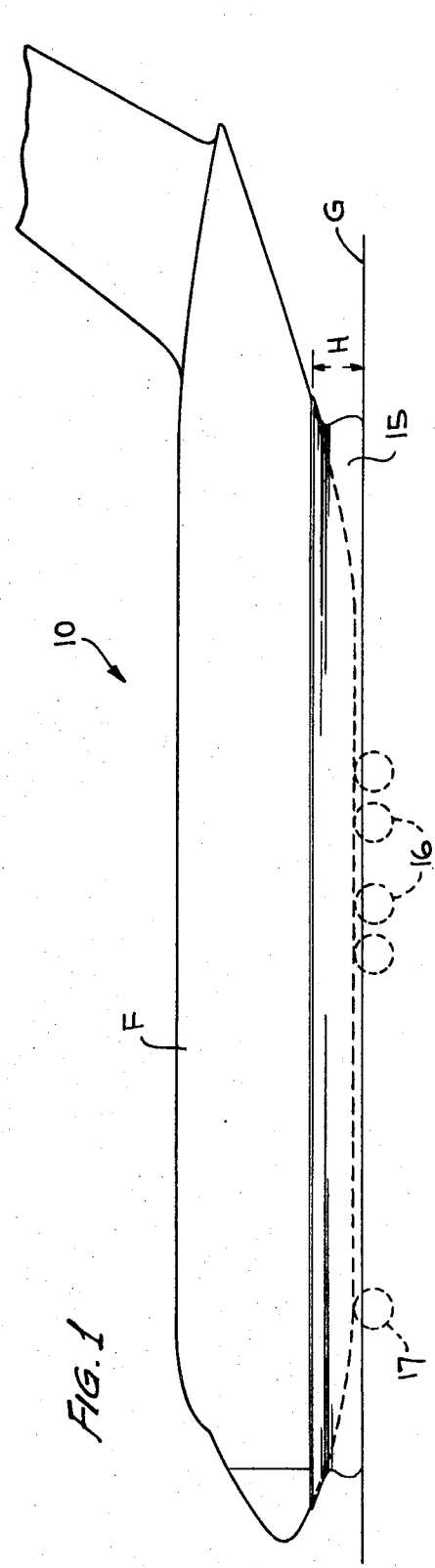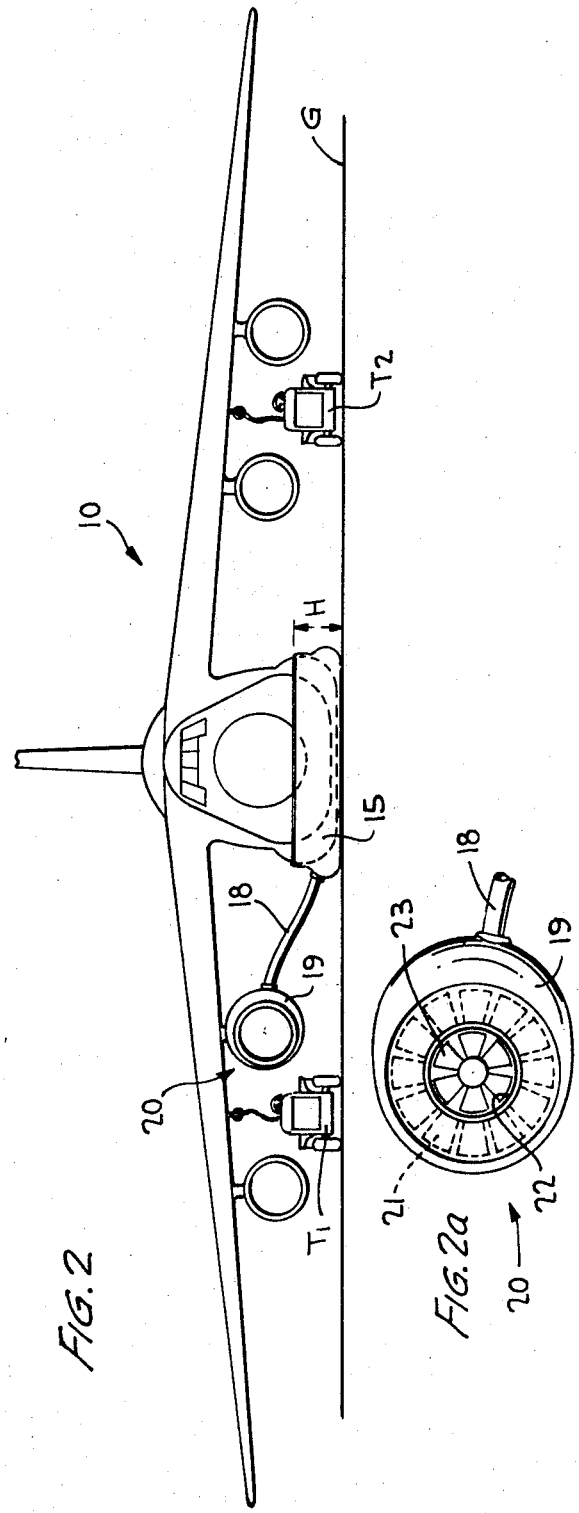

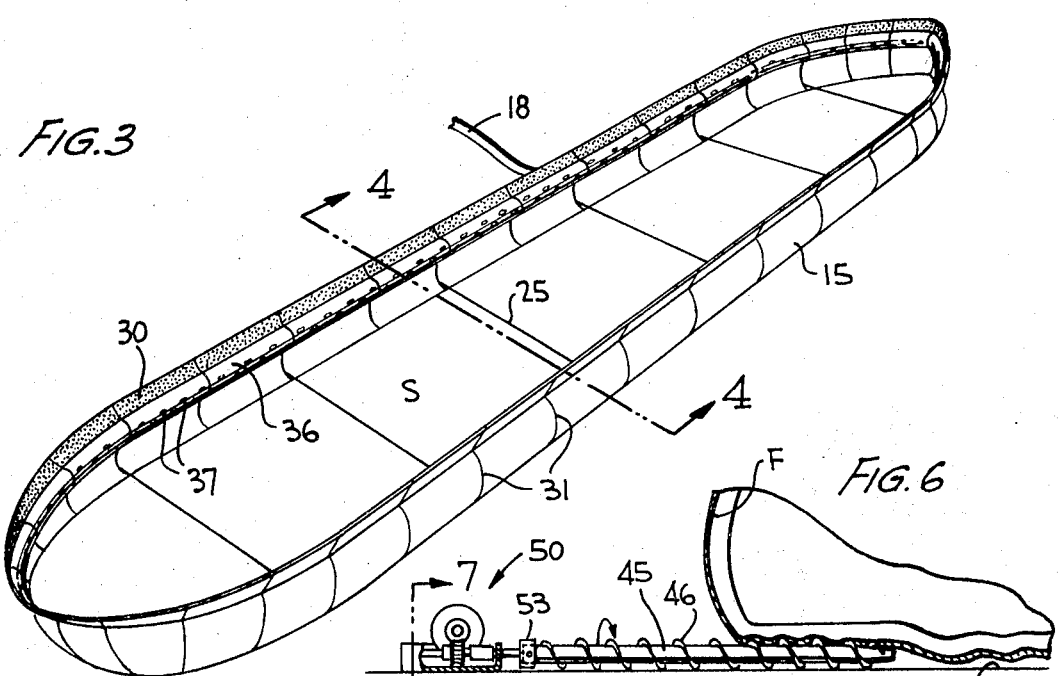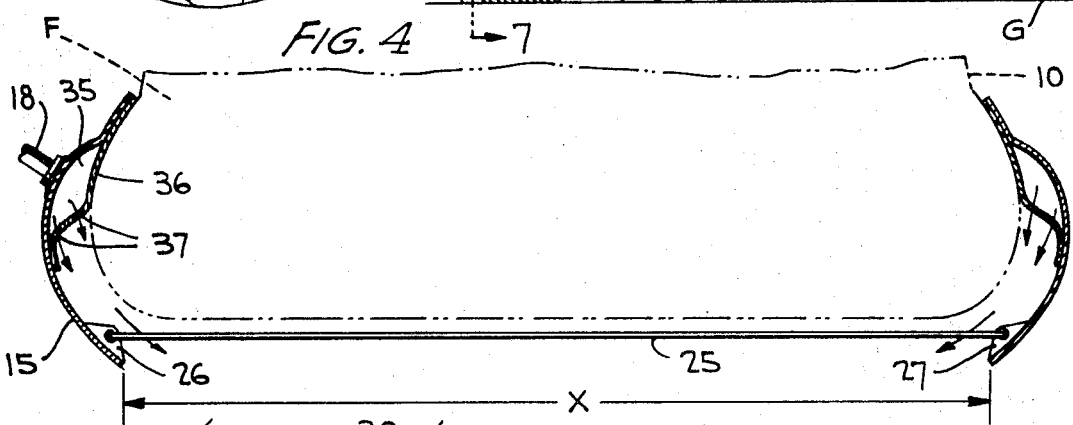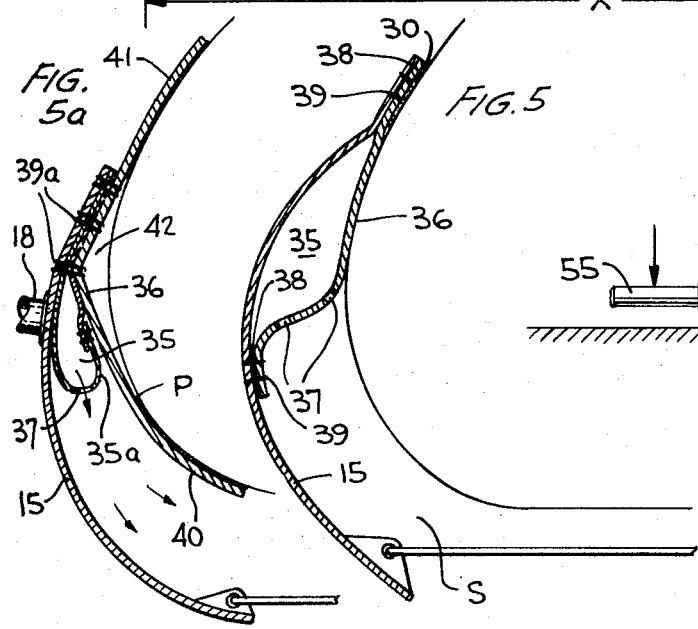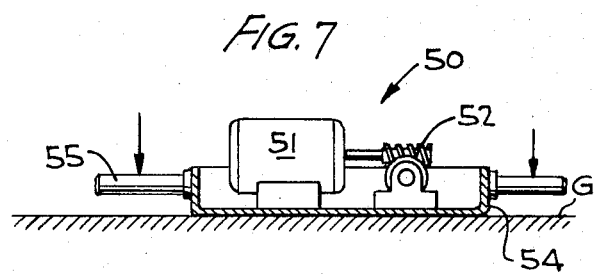

AIR CUSHION SYSTEM FOR AIRCRAFT REMOVAL

The present invention relates to ground effects machines and, more particularly, to a method and apparatus for conversion of a disabled aircraft or other structure to such a ground effects machine.

BACKGROUND OF THE INVENTION

The trend today in the aircraft industry is to manufacture larger and larger ships to carry more and more passengers or cargo. The present-day pinnacle of this development is represented by the C5A transport aircraft manufactured by Lockheed-Georgia Company, a Division of Lockheed Aircraft Corporation for the U.S. Air Force and the Boeing 747 passenger aircraft manufactured by the Boeing Company, Seattle, Wash. The gross weight of these behemoths of the modern aircraft age is presently up to a staggering 750,000 pounds and plans are now being made for even greater weights and payload capability.

Since the advent of these aircraft, the problem has arisen of having to crash land or land "gear-up" of these large aircraft at one of the nations's major or other civilian or military airports and then not being able to reopen the runway within a reasonable time. In short, prior to this invention there has not been provided in the art a system or method that is capable of quick removal of the aircraft from a runway when such a large aircraft is disabled. Such a situation would require that the runway on which the disabled aircraft is positioned be closed for an inordinate length of time, up to four days or more, while mechanics laboriously jack up the aircraft and position supporting dollies underneath so that the aircraft may be towed to a repair site. Thus, there is a need today for a system and method for removal of these large aircraft from the runway within a few hours time so that the runway may be quickly placed back in service to handle the other air traffic.

OBJECTIVES OF THE INVENTION

Accordingly, it is one object of the present invention to provide a method and apparatus for quickly converting a disabled or immobile structure, such as an aircraft, to a ground effects machine whereby the same may be lifted and moved.

It is another object of the present invention to provide a low cost, easily stored and installed conversion kit for lifting immobile structures thereby allowing strategic location of kits in proximity to probable use locations or rapid transfer thereto.

It is still another object of the present invention that allows conversion of a structure to a ground effects machine without having to first jack up the structure to provide clearance.

It is still another object of the present invention to provide a skirt for conversion to a ground effects machine that is attached to an aircraft or the like without permanent damage to the aircraft skin and may be readily removed after use.

It is still another object of the present invention to provide a ground effects skirt with an integral manifold that assists in maintaining the adhering strip in firm face contact with the skin, or alternatively a V-shaped tape, to resist peeling during operation.

BRIEF DESCRIPTION OF THE INVENTION

Briefly considered and in simplified form, the present invention envisions conversion of a disabled aircraft or other immobile structure, such as a house, large tank, large ocean-going ship or the like, to a ground effects machine to allow the same to be easily moved over any reasonably flat terrain, such as land, swamp land or even water. The heart of the conversion apparatus is the utilization of a flexible skirt capable of conforming to the outer configuration of the aircraft and attached to the aircraft by surface-adhering strip means at the top edge of the skirt. Similarly, the heart of the inventive method is concerned with adhesively adhering the upper edge of the flexible skirt to the aircraft to form the captive air space below, and then pressurizing the space to provide the lifting cushion for supporting the aircraft. The strip means, which may take the form of epoxy resin or high-strength adhesive tape, provides for continuous attachment and sealing of the skirt.

The skirt is made of flexible sheet material, such as cloth treated to be substantially impervious, which cloth must be capable of withstanding a pressure of approximately 2.5 pounds per square inch in the case where a transport aircraft is to be moved. The skirt material is preferably selected to give the lightest weight and greatest strength and servicability, and such synthetic materials as nylon, dacron, Teflon, polypropylene and Fiberglas are deemed suitable for this purpose. The lower edge of the skirt is held inwardly to span approximately nine-tenths of the aircraft's width by installing laterally extending cross ties (at intervals about equal to the fuselage width). The cross ties are initially extended by a crawler tube that engages between the bottom of the aircraft and the ground. Rotating means for the tube is provided in the form of a motor and coupling mounted on a skid platform for movement with the tube.

A peripheral manifold formed integrally with the skirt directs openings inwardly around the full periphery to distribute the air supply from an outside pressure source. The inside of the manifold is formed by a flexible wall that lies in face-to-face contact with the outer surface or skin of the structure and thereby isolates the adhesive strip means from sudden pressure changes in the supporting air space, and assists in holding the adhesive strip against the surface to prevent initiation of any peeling action of the strip from the surface thereby improving the peel strength of the joint. If desired, the adhering strip, and particularly contact sensitive adhesive tape if used, may have increased width (approximately equal to the height of skirt) in the form of integral, upwardly and downwardly extending holding flaps so that the potential peeling force at the top of the skirt is translated to a pulling force over a greatly enlarged surface area thereby virtually eliminating the peeling problem. A triangular separation space is maintained at the juncture of the flaps to allow assumption or approximation of a tangential relationship of the flaps with skin of the structure to accomplish this result. Preferably, the air pressure source is gained from the fan outlet nozzle of the nacelle of a fan jet of the aircraft itself through an annular collector and connected transfer tube.

In the case of a crash landed aircraft, the lower portion of the fuselage will most likely have openings therein resulting from the unprotected engagement with the runway pavement. According to another feature of this invention, these openings are not attempted to be repaired, but the entire interior of the aircraft is pressurized with any openings in the upper portion of the aircraft being patched to preclude the escape of air therefrom. Tugs are attached to the wing tie-down points to move and steer the aircraft after the supporting cushion is formed.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DESCRIPTION OF THE DRAWINGS

FIG. 1 is a side view of an aircraft fuselage showing the installation of the flexible skirt of the present invention;

FIG. 2 is a front view of the aircraft of FIG. 1 showing the attachment of the transfer tube and collector to the nacelle of the aircraft fan jet;

FIG. 2a is a detailed view of the rear of the fan jet showing the annular collector collar over the fan jet portion;

FIG. 3 is a perspective layout view of the flexible skirt illustrating the adhesive adhering strip and the distributing manifold;

FIG. 4 is a cross-sectional view taken along line 4—4 of FIG. 3 showing the passage of air into the air space forming the air cushion;

FIGS. 5 and 5a are enlarged cross-sectional views of two alternatives of the flexible skirt, manifold and adhering strip combination;

FIG. 6 is a cross-sectional view showing the crawler tube and driving means of the conversion kit for initially extending the cross lines under a crash landed aircraft; and FIG. 7 is a cross-sectional view taken along line 7—7 of FIG. 6 showing the drive motor for the crawler tube and the supporting skid.

DETAILED DESCRIPTION OF THE INVENTION

With reference now to FIG. 1 of the drawings and relating this figure to FIG. 2, one particular application of the conversion kit of the present invention and the associated method has been illustrated and may be considered as the preferred embodiment. In this embodiment, the structure being moved is a disabled transport aircraft, generally designated by the reference numeral 10, and as will be recognized by those skilled in the art may be one of the Lockheed built C5A transport aircraft. Thus, while the preferred embodiment will be discussed with respect to supporting and moving the aircraft 10, it is to be understood that other structures, such as buildings, storage tanks and the like may be successfully used by employing the teachings of this invention.

A flexible skirt 15 is attached at its upper edge around the lower portion of fuselage F of the aircraft; the lower edge of the skirt being in juxtaposition (operative relationship) with ground or runway G. It will be noted in FIGS. 1 and 2 that the skirt 15 is preferably attached so as to be at substantially the same height H around the full periphery of the fuselage F.

As shown in FIG. 1, the aircraft 10 in the air-cushion supported condition is closer to the ground G than it would have been if the landing gear 16, 17 (shown in dotted line outline) had been employed to land the aircraft. In this condition, the aircraft is thus capable of being moved in accordance with the invention since the frictional engagement between the fuselage F and the ground G has been relieved. However, it should be understood that the skirt 15 could be satisfactorily attached and made to support the fuselage F when the aircraft has crash landed in other positions (other than ideal conditions), such as when the aircraft lands with one gear up and the fuselage F thus resting at an oblique angle to the ground G. All that is necessary is that the lower edge of the skirt 15 be brought into juxtaposition to the ground G so that the air cushion may be formed and maintained. To do this, the skirt 15 may be attached at a different height H with respect to the fuselage than the other side. In this case, the maintenance of balance of the aircraft is more critical and must be maintained during subsequent removal movement by outside forces, such as by tow lines and/or by only partial lifting sufficient to reduce but not eliminate frictional engagement of the aircraft with the ground.

When inflated to the operative position, the sides of the skirt 15 are bowed outwardly by the air cushion, as can be seen in these two Figures. The actual supply of air to air-cushion space S, defined by the lower portion or belly of the aircraft 10 and the skirt 15, is provided by a transfer tube 18; it being understood that additional tubes could be employed if needed. At the inlet end of the tube 18, an annular collector collar 19 is provided to receive compressed air from the nacelle of the aircraft's engine 20.

As shown in FIG. 2a, this annular collar 19 is attached only to the fan portion of the engine 20, as depicted by the fan blades 21, shown in dotted line outline in this Figure. The hot gas exhaust of the engine 20 is represented by the opening 22 with final stage turbine blades 23 being visible therein. Since none of the hot combustion gases are transferred to the air cushion space S beneath the aircraft 10, no problem of overheating or the need for expensive heat resistant materials for the components of the kit is necessary.

In FIG. 3, the skirt 15 is shown in perspective view without the aircraft 10 that it is intended to support. As can be seen, the peripheral lower edge of the skirt 15 is held so as to be directed inwardly (see FIG. 4) by a plurality of cross lines or ties 25. These cross lines may be suitably attached to the lower edge by tabs 26, 27 and for optimum skirt stability and control the tips of the lower edge are spaced a distance X apart that is approximately 90 percent of the width of the aircraft fuselage F, as shown in FIG. 4.

At the top edge of the skirt 15 a surface adhering strip 30 is applied and forms an important feature of the present invention. This strip 30 may be in the form of an epoxy resin layer, that securely bonds the skirt 15 around the full periphery of the fuselage F for continuous attachment and sealing of this top edge. Because of this feature of adhesively adhering the skirt 15 to the aircraft 10, the fuselage F does not have to be penetrated for attachment of fasteners. This means that the skirt 15 may be removed from the vehicle after use without permanent damage to the skin thereof, thus holding the required maintenance work to rebuild a crash landed aircraft to a minimum. All that needs to be done in most cases to remove the skirt 15 is to apply a solvent to the adhesive strip 30 thereby leaving the clean skin of the aircraft.

As best shown in FIGS. 4 and 5, the pressurized air supply received through transfer tube 18 is distributed around the full periphery of the skirt 15 through a manifold 35. The manifold in effect is integral with the top portion of the skirt 15 and includes an inner peripheral wall 36 having a plurality of nozzle openings 37 therein. While not shown, it should be understood that these openings may be graduated around the periphery towards smaller openings as the proximity of the transfer tube 18 is approached, as is common practice in air distribution systems. The supplying of air through a manifold 35 around the periphery is important in this environment since blasts of air against the ground and excessive turbulence at the intake area tending to cause skirt "flutter" and disruption of the seal around the lower edge is avoided.

In FIG. 5, the peripheral wall 36 is shown as attached to the skirt 15 in any known manner such as by upper and lower layers or joints 38 of high strength adhesive. If desired, mechanical fasteners 39 or sewing may be employed as an alternative, or as an additional means, to form the seal and to assure against separation at these joints.

In order to reduce the mechanical load on the adhering strip 30 and to distribute the load across the full width of the strip, the manifold 35 is formed so as to assume a substantially tear shape in cross section with the interior peripheral wall 36 being at least partially contiguous with and in sealed relationship with the outer surface or skin of the aircraft 10, as shown in FIGS. 4 and 5. The air pressure in the manifold 35 is slightly greater than the pressure in the air cushion space S due to the loss experienced in passing through the nozzle openings 37, thus assuring the tear shaped configuration and the contiguous relationship during normal operation. During start-up, the manifold 35 is pressurized first to form the seal, however the tear shape is maintained and ballooning avoided by the presence of the cross ties and the immediately following occurrence of filling of the space S. This relationship and feature of the invention effectively isolates the strip 30 from any transient increases in pressure in the space S that might be caused by a sudden shift of the aircraft 10, such as might occur by completely closing off the slight air-escape area between the lower edge of the skirt 15 and the ground G. The laying of the wall 36 flat against the aircraft surface also assures that a peeling of the strip 30 starting from the inside or leading edge of said strip is effectively minimized since there is no angle to start a peeling action at this point. In other words, the force is effectively transferred over the full width of the strip 30 rather than being limited just by the leading edge so that in effect a shearing (as opposed to peeling) of the strip 30 is required before separation can occur. This means that an adhesive with less stringent requirements for peel strength may be used than would otherwise be required, and reliance may be put instead on the lap shear strength of the adhesive which is normally several times higher (for example a coefficient of 3,000-4,000 lbs./in.$^2$ as opposed to 100-125 lbs./in. for typical high strength epoxy resins).

As mentioned above, epoxy resins may be selected for the sealing areas at the strip 30, and at the joints 38. There has been wide acceptance of these adhesives in the aircraft industry because of their simplicity of use, and their superior holding strength on aluminum and other material. For example, reference may be made to the publication entitled "Epoxy Resins" by Irving Skeist, Reinhold Publishing Corporation, New York, Copyright 1960, and in particular Chapter 10 commencing at page 180 therein. Also, I have investigated particular epoxy resins, such as those shown and described in U.S. Pats. No. 3,477,966 issued Nov. 11, 1969 to Phillips Petroleum Company and No. 3,525,779, issued Aug. 25, 1970 to Dow Chemical Company and find that sufficiently high peel and lap shear strength properties are exhibited for these particular resins to allow successful utilization in performance of the teachings of my invention.

Although known surface contact adhesive tapes have somewhat less strength than the epoxy resins, successful use of these is possible when minimizing the necessity for high peel strength by the special tear shape configuration of the manifold 35, thus effectively isolating the strip 30 from excessive forces as noted above.

In FIG. 5a is shown an alternative arrangement wherein the adhering strip assumes the form of adhesive tape having greatly extended width, as compared to the strip 30, and preferably equal to at least approximately the height of the skirt 15. Of importance is that the tape includes a flap 40 extending downwardly along and in contact with the fuselage F of the aircraft so as to form the interface between the skin of fuselage and the pressurized space S. The tape is thus firmly held in contact with the skin by the increased pressure within the space S and there is no peel angle formed at the leading line of contact. Note point P of the flap 40 in FIG. 5a, that is, in this case actually the point of tangency with the curved fuselage F, forms no angle; i.e., there is substantially 0° between the attached and unattached portions of the flap. Because of the extended area of contact and there being no peel angle, potential peeling force is translated into tangential pulling force thereby rendering the much higher lap shear strength (lap shear coefficient X area of contact), the limiting factor as to strength of the joint.

The tape preferably also extends upwardly with a flap 41 to form the top of the skirt 15. A triangular shaped space 42 is formed at the juncture between the flaps so that the tape is V-shaped with the pulling force being directed toward the juncture virtually eliminating the tendency of the contact seal area to peel away.

Suitable contact sensitive tapes having sufficient lap shear strength are readily available, such as those tapes shown in U.S. patents Gorman, U.S. Pat. No. 3,479,311, issued Nov. 18, 1969, and Grossman et al., U.S. Pat. No. 3,508,949, issued Apr. 28, 1970.

The manifold 35a is separately formed in the embodiment of FIG. 5a and a folded over portion sewn or fastened by fasteners 39a to the skirt 15 and the tape. The overlapped edges of the manifold 35a may be sewn together but remain loose from the tape.

As to the materials to be used for the other components of the conversion kit as heretofore described, the skirt 15 itself may be a flexible canvas or other cloth, preferably fabricated of relatively high-strength, light weight fibers, such as nylon, dacron, polypropylene or Fiberglas. The cloth is covered or blinded off by a flexible plastic coating, such as a plastic base paint, so as to make the same substantially impervious to the passage of air. In certain instances, the spraying of water or other liquid on the skirt may be used to sufficiently block the pores of the fabric to maintain the air cushion in tact, or in other cases, water may be used or treated skirts to increase the efficiency of the sealing, as may be required by greater than design loads being lifted. The strength of the skirt 15 should be such as to withstand a force of 180 pounds per inch with only moderate stretching, which is within the state of the art of the above material. The cross lines 25 are preferably fabricated of metal to provide limited stretching, to prevent cutting by ragged edges of the plane and deleterious abrading by the concrete runway and should be capable of withstanding a pull of about 8,000 pounds. The cross lines are preferably positioned at equal intervals about equal to the fuselage width along the length of the fuselage F, as shown in FIGS. 1-3. The cross lines 25 give and maintain the bulged out shape of the skirt 15 for stability and to maintain the lower sealing edge along the ground G to prevent skirt "flutter" and loss of the air cushion. Bow-shaped reinforcing or shaping ribs 31 may be provided if desired in conjunction with the cross lines 25 to lend body to the skirt 15 and to encourage formation of a proper shape of the skirt 15 especially when start-up of the air cushion system occurs.

Another important feature of the conversion kit and method of the present invention is concerned with the initial extension of the cross lines 25 underneath the fuselage F of the disabled aircraft 10 by means of a crawler tube 45, as shown in FIG. 6. The cross line 25 is placed inside the tube 45 and attached to the forward end thereof. The spiral thread 46 on the exterior of the tube 45 allows effective engagement with the fuselage F and the ground G to cause the tube 45 to crawl forwardly under the fuselage F even though there is originally maybe no space.

To rotate the tube 45, a motor assembly 50 may be provided including motor 51, a worm and pinion drive gear combination 52 and a drive coupling 53, as shown in FIGS. 6 and 7. The motor assembly 50 is preferably mounted on a support skid 54 so that upon advance of the tube 45, the driving motor may follow as necessary. If required, outrigger handles 55 may be provided on both sides of the skid 54 in order to apply an effective force to counteract the turning moment during forward and reverse direction operation, as noted by the force arrows in FIG. 7.

After the line has been extended under the structure, the ends are attached to the corresponding tabs 26, 27 to stabilize the skirt as indicated above. The crawler tube 45 may remain on the line 25 during the operation of the air cushion device. However, if desired, the forward end of the line 25 may be simply removed from its attachment with the tube 45 and the motor assembly 50 driven in the reverse direction to withdraw the tube whereby it can be utilized to extend the other lines 25. If individual tubes 45 remain under the aircraft 10 with each cross line, the coupling 53 is simply released from the tube 45 at the end of the forward driving action.

In operation, the crash landed aircraft 10 is first measured around the periphery and a height H above the ground G established and marked accordingly. The epoxy resin strip 30 is next applied around the perimeter of the aircraft 10 in accordance with the marking and directly on the skin of the fuselage F. As this is performed, a workman follows behind laying the upper edge of the skirt 15 on the strip 30 and then the edge is suitably held in position the required time for curing. After the skirt 15 has been mounted around the full perimeter of the fuselage F, a suitable connection of the two ends (not shown) is made. The annular collector collar 19 is applied to the nacelle of the disabled aircraft and the transfer tube 18 is connected to the skirt 15 in the proper manner. It should be noted at this point that the source of air pressure may be alternatively taken from a sister aircraft or even from other sources, such as separate compressors in accordance with the broad teachings of the present invention.

Next, initial air pressure is preferably provided to the space S underneath the fuselage F to check for leaks around the perimeter of the strip 30. With respect to the openings ripped in the bottom of the fuselage F by the crash landing, no attempt has been made to repair these, but instead the interior of the aircraft is allowed to be pressurized. Then during this initial pressurization, all doors and other openings are checked for assurance that the upper portion of the fuselage F is now tightly sealed off. Any rips in the upper portion of the fuselage F may be temporarily patched with epoxy resin and treated cloth of the type used for the skirt 15. A pair of tugs T1, T2 are attached by lines to the wing tie-down or hard points, as shown in FIG. 2. The system is ready for the lifting and moving operation.

The jet engine 20 is now powered at sufficient speed to cause the aircraft 10 to be lifted and supported on an air cushion. In the case of a C5A transport, approximately 2.5 p.s.i.g. accomplishes this purpose and powering of the engine at slightly greater than idle speed has been calculated to give the necessary air supply. Once the aircraft is supported on the air cushion, the tugs T1, T2 are used to steer and maneuver the aircraft 10 to remove the same from the runway and to a repair site. By drawing the lines on the tugs T1, T2 taut, the balance of the aircraft may be maintained in an advantageous manner, which is particularly important when the aircraft 15 has landed in other than a total upright position.

In summary, it can be seen that a simple, inexpensive conversion kit and method has been provided to allow quick removal of aircraft from runways after the aircraft has crash landed and is disabled. The skirt 15 is attached directly to the fuselage F by an adhering strip 30 and cross lines 25 stabilize the skirt to form an air cushion in the space S to allow supporting of the aircraft 10. The peripheral manifold 35 allows distribution of the air pressure supply around the perimeter of the fuselage F and because of its unique tear shape isolates the strip 30 to gain special advantages in terms of reducing the requirements for peel strength and allowing reliance on the lap shear strength. The air supply is conveniently gained directly from the fan jet portion of the aircraft's engine 20 and steering, balancing and movability is provided by conventional tugs T1, T2. Thus, with this system the necessary components may be prepositioned or quickly flown in to any airfield in the world, the kit attached to the aircraft and the aircraft removed from the runway so that the airfield may be opened to other air traffic within a matter of hours, either in peace time or in critical war time situations. Further, no appreciable space is required between the fuselage F and the ground G to install the inventive system, such as is required when supporting an aircraft on separate ground effects machines known as "air barges", and no permanent damage is done to the fuselage by adhesively adhering the skirt 15 thereto thus greatly reducing the rebuilding requirements for the aircraft 10.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

I claim:

1. A kit for quick conversion of an immobile, large aircraft-size structure to a ground effects machine comprising a flexible skirt capable of conforming to the outer configuration of said structure around the periphery thereof, surface-adhering strip means for continuous adhesively attaching and sealing of the top portion of said skirt to said structure, means for holding the lower edge of said skirt in juxtaposition to the ground and directed inwardly to provide a captive air space defined by the lower portion of said structure and said skirt, and air pressure means for introducing a superatmospheric air supply to said space to provide a lifting force for supporting said structure.

2. The conversion kit of claim 1 wherein, said air pressure means including a manifold extending around the periphery of said skirt and having inwardly directed openings to distribute the air supply, an outside pressure source, and an air transfer tube connecting said manifold and said outside pressure source, said manifold being formed along the inside of said skirt and positioned below and adjacent said strip means.

3. The conversion kit of claim 1 wherein said pressure source includes a fan jet, an annular collector collar mounted over the fan outlet portion of the nacelle of the jet to receive the cool pressurized air and transfer the same to said inlet tube.

4. The conversion kit of claim 1 wherein said strip means comprises a high-strength contact adhesive tape including a flap extending downwardly from said top portion of said skirt and forming the interface between said space and said structure, said flap being connected to said structure so as to form no peel angle to permit reliance on the lap shear strength of said tape.

5. The conversion kit of claim 4 wherein said strip means further comprises an upwardly extending flap forming the top portion of said skirt, said upwardly extending flap being connected to said structure so as to form no peel angle to permit reliance on the lap shear strength of said tape.

6. The conversion kit of claim 5 wherein said flaps form a substantially V-shaped juncture spaced from said surface.

7. The conversion kit of claim 1 wherein said strip means is readily removable from said structure after use without permanent damage to the skin thereof.

8. The conversion kit of claim 1 wherein said strip means comprises a high-strength epoxy resin.

9. A kit for quick conversion of an immobile structure to a ground effects machine comprising a flexible skirt capable of conforming to the outer configuration of said structure around the periphery thereof, surface-adhering strip means for continuous attachment and sealing of the top portion of said skirt to said structure, means for holding the lower edge of said skirt in juxtaposition to the ground and directed inwardly to provide a captive air space defined by the lower portion of said structure and said skirt, and air pressure means for introducing a superatmospheric air supply to said space to provide a lifting force for supporting said structure, said holding means including cross ties extending laterally across said structure and interconnected to the lower edge of said skirt.

10. The conversion kit of claim 9 wherein is further provided crawler means for initially extending said cross lines underneath said structure.

11. The conversion kit of claim 10 wherein said crawler means includes a tube through which a cross line passes, spiral thread means on said tube for operative engagement with the bottom of said structure and said ground, and means to rotate said tube to provide crawling action.

12. The conversion kit of claim 11 wherein said means to rotate comprises a motor, coupling means to connect said motor and said tube, and a skid platform for mounting said motor for movement with said tube.

13. A kit for quick conversion of an immobile structure to a ground effects machine comprising a flexible skirt capable of conforming to the outer configuration of said structure around the periphery thereof, surface-adhering strip means for continuous attachment and sealing of the top portion of said skirt to said structure, means for holding the lower edge of said skirt in juxtaposition to the ground and directed inwardly to provide a captive air space defined by the lower portion of said structure and said skirt, and air pressure means for introducing a superatmospheric air supply to said space to provide a lifting force for supporting said structure, the inside of said manifold being formed by a flexible wall, said manifold being substantially tear-shaped in cross section when inflated and at least partially contiguous in sealed relationship with the outer surface of said structure, whereby said strip means is isolated from sudden pressure changes in said space and held flat against said surface to resist peeling.

14. The method of quick conversion of immobile, large aircraft-size structure to a ground effects machine comprising the steps of adhering by strip means the upper portion of a flexible skirt directly to the outer peripheral surface of said structure, holding said skirt so that the lower edge of said skirt is in juxtaposition to the ground, whereby to form a captive air space defined by the lower portion of said structure and said skirt, and then pressurizing said space with a superatmospheric air supply to provide a lifting force for supporting said structure.

15. The method of conversion of claim 14 further including the step of pressurizing the interior of said structure through openings in said lower portion communicating with said air space, and patching any openings in the upper portion of said structure to preclude the escape of air therefrom.

16. The method of conversion of claim 15 wherein the structure is an aircraft and further including the step of attaching control lines to the wing tie-down points, and moving, balancing and steering said aircraft by tugs attached to said lines.

17. The method of conversion of claim 14 wherein the vehicle is an aircraft and further including the step of obtaining said air supply from the fan portion of a fan jet of said aircraft.

18. The method of conversion of claim 14 wherein the adhering step is performed by applying an adhesive tape.

19. The method of conversion of claim 18 wherein the step of applying the adhesive is performed only by pressure contact.

* * * * *